United States Patent
Gim et al.

(10) Patent No.: US 11,724,587 B2
(45) Date of Patent: Aug. 15, 2023

(54) RADIATOR SUPPORT UPPER MEMBER ASSEMBLY

(71) Applicants: HYUNDAI MOTOR COMPANY, Seoul (KR); KIA CORPORATION, Seoul (KR)

(72) Inventors: Seokju Gim, Seongnam-si (KR); Byung Gyu Kim, Uiwang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 123 days.

(21) Appl. No.: 17/347,040

(22) Filed: Jun. 14, 2021

(65) Prior Publication Data

US 2022/0126678 A1 Apr. 28, 2022

(30) Foreign Application Priority Data

Oct. 23, 2020 (KR) .................. 10-2020-0137951

(51) Int. Cl.
*B60K 11/04* (2006.01)
*B60R 19/02* (2006.01)
*B60Q 1/04* (2006.01)

(52) U.S. Cl.
CPC .............. *B60K 11/04* (2013.01); *B60Q 1/04* (2013.01); *B60R 19/023* (2013.01)

(58) Field of Classification Search
CPC ........ B60K 11/04; B60Q 1/04; B60Q 1/0433; B60R 19/023; B60R 19/12; B60R 19/24; B62D 25/084; B60Y 2304/03; B60Y 2410/124; B60Y 2304/05; B60Y 2304/07; B60Y 2304/072
See application file for complete search history.

(56) References Cited

U.S. PATENT DOCUMENTS

2014/0084608 A1 * 3/2014 Hasegawa ............... B60R 19/18
                                                    293/132
2016/0031484 A1 * 2/2016 Nakauchi ................ B60R 19/24
                                                    296/187.09

FOREIGN PATENT DOCUMENTS

| CN | 201736794 U | * | 2/2011 | |
| CN | 105073562 A | * | 11/2015 | ............. B60K 11/04 |
| EP | 2284066 A2 | * | 2/2011 | ........... B62D 25/084 |
| EP | 2915703 A1 | * | 9/2015 | ............. B60R 19/12 |
| JP | H0213853 U | * | 1/1990 | |
| JP | H0459583 U | * | 5/1992 | |
| JP | H04212683 A | * | 8/1992 | |
| JP | 2512289 Y2 | * | 9/1996 | |
| JP | 2851341 B2 | * | 1/1999 | |
| JP | 2999536 B2 | * | 1/2000 | ............. B62D 65/04 |
| JP | 2003019981 A | * | 1/2003 | |
| JP | 2004175245 A | * | 6/2004 | |
| JP | 2008126797 A | * | 6/2008 | |
| JP | 4144689 B2 | * | 9/2008 | |

(Continued)

*Primary Examiner* — Hung Q Nguyen
(74) *Attorney, Agent, or Firm* — Lempia Summerfield Katz LLC

(57) ABSTRACT

A radiator support upper member assembly includes: an upper inner panel including an inner flange protruding toward a front direction, and an upper outer panel including an outer flange, wherein the outer flange protrudes toward the front direction and is configured to overlap the inner flange and form a front flange, and the upper inner panel and the upper outer panel are joined and form a closed cross-section.

15 Claims, 13 Drawing Sheets

(56) References Cited

FOREIGN PATENT DOCUMENTS

| JP | 2010247573 | A | * | 11/2010 | | |
|---|---|---|---|---|---|---|
| JP | 2014024463 | A | * | 2/2014 | | |
| JP | 2014069695 | A | * | 4/2014 | | |
| JP | 2015145208 | A | * | 8/2015 | | |
| JP | 6048331 | B2 | * | 12/2016 | | |
| JP | 2017007451 | A | * | 1/2017 | | |
| JP | 6402694 | B2 | * | 10/2018 | | |
| VN | 10015734 | B | * | 8/2016 | ............ | B60R 19/52 |
| WO | WO-2012067059 | A1 | * | 5/2012 | ............ | B60R 19/52 |
| WO | WO-2012147546 | A1 | * | 11/2012 | ............ | B60R 19/18 |
| WO | WO-2017077800 | A1 | * | 5/2017 | ............ | B60R 21/34 |

* cited by examiner

RADIATOR SUPPORT UPPER MEMBER ASSEMBLY

CROSS-REFERENCE TO RELATED APPLICATION

This application claims priority to and the benefit of Korean Patent Application No. 10-2020-0137951, filed on Oct. 23, 2020, the entire contents of which are incorporated herein by reference.

FIELD

The present disclosure relates to a radiator support upper member assembly.

BACKGROUND

The statements in this section merely provide background information related to the present disclosure and may not constitute prior art.

A radiator support is a component that welds parts such as bumpers and lamps with a separate bracket for mounting parts.

However, in a general radiator support, bumper deflection and welding marks due to its self-load are exposed to the outside, resulting in deteriorated appearance, and it is difficult to manage gaps and tolerances.

In addition, in general radiator support, a bumper cover and a head lamp are mounted by welding a separate bracket, which increases the material cost and weight, and increases the investment cost for the mold and assemble jig.

The above information disclosed in this Background section is only for enhancement of understanding of the background of the disclosure, and therefore it may contain information that does not form the prior art that is already known to a person of ordinary skill in the art.

SUMMARY

The present disclosure provides a radiator support upper member assembly that may reduce manufacturing cost and weight.

A radiator support upper member assembly according to one form of the present disclosure may include: an upper inner panel including an inner flange protruding toward a front direction; and an upper outer panel including an outer flange, wherein the outer flange protrudes toward the front direction and is configured to overlap the inner flange and form a front flange, and the upper inner panel and the upper outer panel are joined and form a closed cross-section.

The inner flange and the outer flange may be welded together.

The upper outer panel may include a lower panel forming a bottom of the closed cross-section, an upper panel forming a top of the closed cross-section, and a side panel connecting the lower panel and the upper panel.

The outer flange and the upper panel may form a step shape and the outer flange may be positioned higher than the upper panel.

An end portion of the upper panel may be a burring processed portion.

The upper outer panel may further include a lower flange bent at the lower panel and in contact with the upper inner panel, and the upper inner panel and the lower flange may be bolted together.

A radiator support upper member assembly may further include a bumper cover connected to the front flange.

A radiator support upper member assembly may further include a bumper cover hole formed on the front flange, and the bumper cover may be connected to the front flange through the bumper cover hole.

The bumper cover may be bolted to the front flange.

The upper outer panel may include a lower panel forming a bottom of the closed cross-section, an upper panel forming a top of the closed cross-section, and a side panel connecting the lower panel and the upper panel, and the outer flange and the upper panel may form a step shape and the outer flange may be positioned higher than the upper panel.

The bumper cover may include an end that is bent, formed in a step shape, and contacts the outer flange and the upper panel.

A radiator support upper member assembly may further include an assemble guide hole formed on the front flange, and an assemble guide pin inserted into the assemble guide hole and formed on the bumper cover.

A radiator support upper member assembly may further include a head lamp coupled to the front flange.

A radiator support upper member assembly may further include a head lamp hole formed in the front flange, and the head lamp may be connected to the front flange through the head lamp hole.

The head lamp may be bolted to the front flange.

A radiator support upper member assembly may further include an overslam bumper provided on the head lamp.

A radiator support upper member assembly may further include a strength bead formed on the upper inner panel.

According to the radiator support upper member assembly according to one form of the present disclosure, it is possible to reduce the cost and weight due to the deletion of the bracket, and to reduce the investment cost.

According to the radiator support upper member assembly according to one form of the present disclosure, it is possible to cover the welding traces and to improve the marketability.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
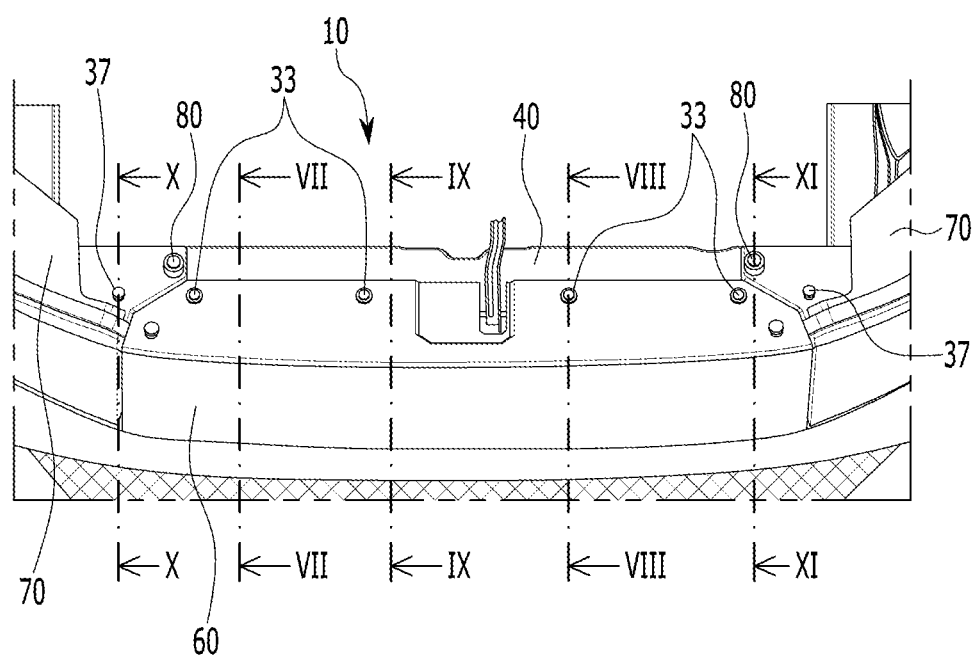
FIG. 1 is a front view of a radiator support upper member assembly according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the drawings, the thickness of layers, films, panels, regions, etc., are exaggerated for clarity.

When a part such as a layer, film, region, or plate is said to be "on" another part, this includes not only the case directly above the other part, but also the case where there is another part in between.

In contrast, when an element is referred to as being "directly on" another element, there are no intervening elements present.

Throughout the specification, when a part "includes" a certain component, it means that other components may be further included rather than excluding other components unless specifically stated to the contrary.

Figure 2:
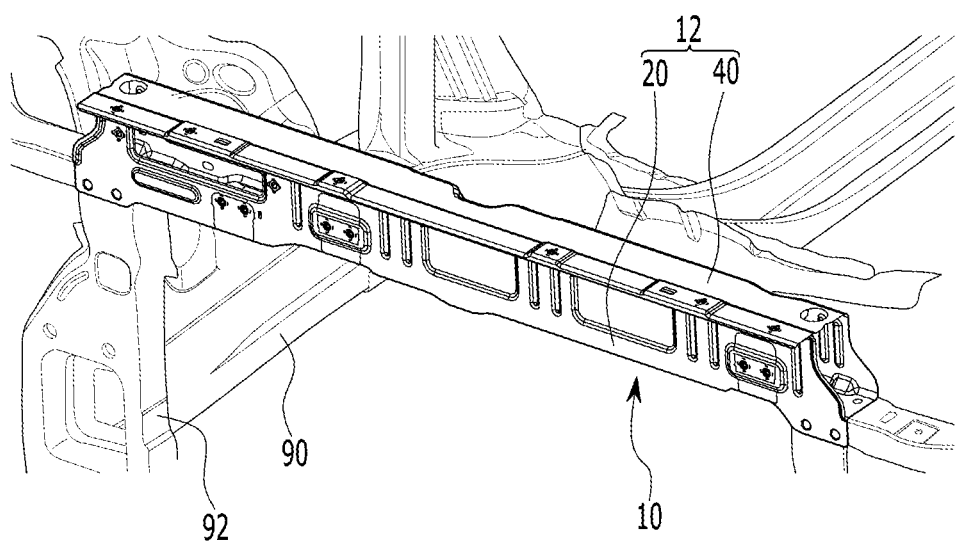
FIG. 2 is a partial perspective view of a radiator support upper member assembly according to one form of the present disclosure.

FIG. 1 is a front view of a radiator support upper member assembly according to one form of the present disclosure, and FIG. 2 is a partial perspective view of a radiator support upper member assembly according to one form of the present disclosure.

Referring to FIG. 1 and FIG. 2, a radiator support upper member assembly 10 according to one form of the present disclosure may include an upper inner panel 20 and an upper outer panel 40, and the upper inner panel 20 and the upper outer panel 40 are combined to form a radiator support upper member 12.

As shown in FIG. 1, a bumper cover 60 and a head lamp 70 may be mounted on the radiator support upper member 12.

Also, as shown in FIG. 2, the radiator support upper member 12 may be mounted to a front member 90 through a side member 92. Structures of the side member 92 and the front member 90 are obvious to those of ordinary skill in the art, so a detailed description thereof will be omitted.

Figure 3:
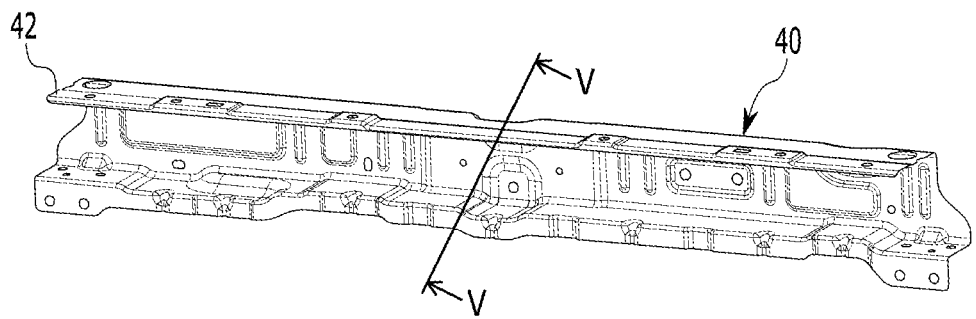
FIG. 3 is a perspective view of an upper outer panel of a radiator support upper member assembly according to one form of the present disclosure.
Figure 4:
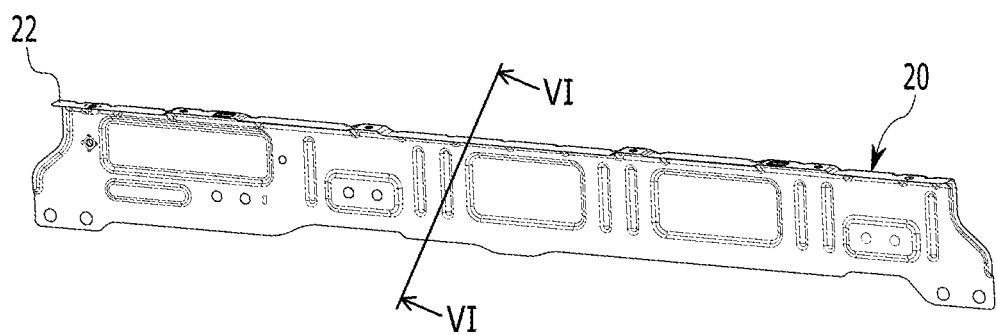
FIG. 4 is a perspective view of an upper inner panel of a radiator support upper member assembly according to one form of the present disclosure.

FIG. 3 is a perspective view of an upper outer panel of a radiator support upper member assembly according to one form of the present disclosure, and FIG. 4 is a perspective view of an upper inner panel of a radiator support upper member assembly according to one form of the present disclosure.

Figure 5:
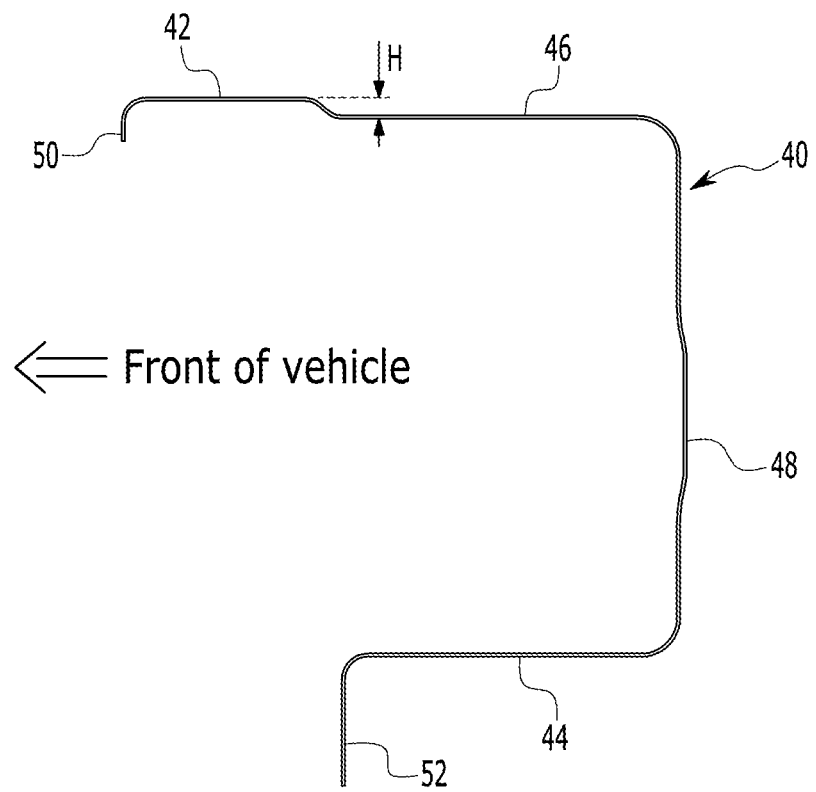
FIG. 5 is a cross-sectional view along the line V-V of FIG. 3.
Figure 6:
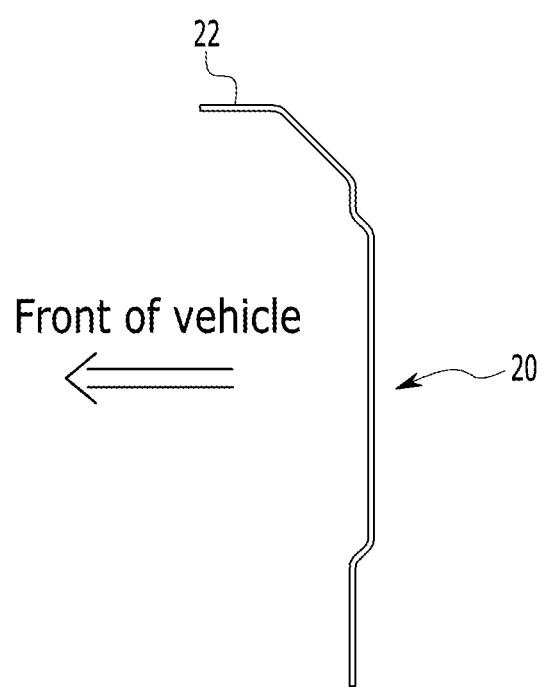
FIG. 6 is a cross-sectional view along the line VI-VI of FIG. 4.

FIG. 5 is a cross-sectional view along the line V-V of FIG. 3, and FIG. 6 is a cross-sectional view along the line VI-VI of FIG. 4.

Referring to FIG. 4 and FIG. 6, the upper inner panel 20 includes an inner flange 22 protruding toward the front direction of the vehicle.

Referring to FIG. 3 and FIG. 5, the upper outer panel 40 includes an outer flange 42 protruding towards the front direction of the vehicle.

Figure 7:
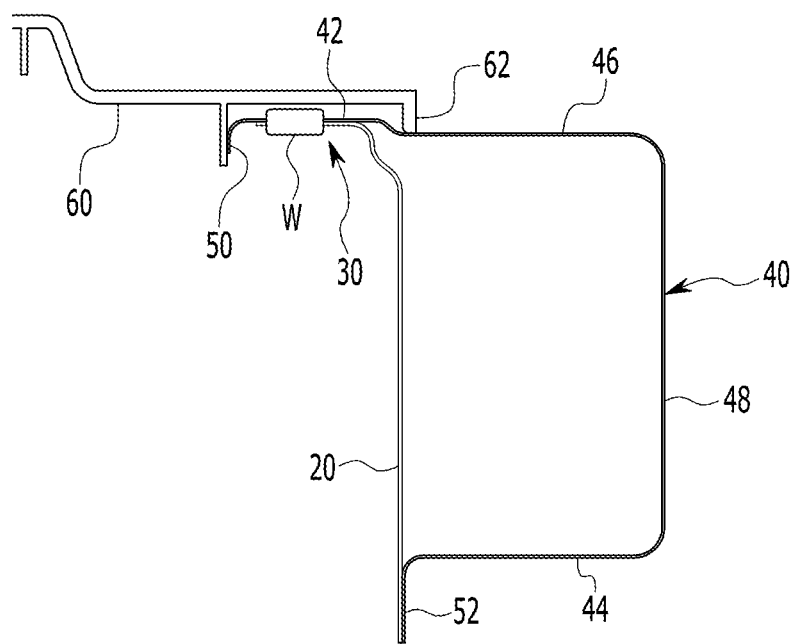
FIG. 7 is a cross-sectional view along the line VII-VII of FIG. 1.

FIG. 7 is a cross-sectional view along the line VII-VII of FIG. 1.

Referring to FIG. 7, the outer flange 42 overlaps the inner flange 22 to form a front flange 30, and the upper inner panel 20 and the upper outer panel 40 are combined to form a closed cross-section.

The inner flange 22 and the outer flange 42 can be welded together.

Referring to FIG. 5 and FIG. 7, the upper outer panel 40 includes a lower panel 44 forming a lower part of the closed cross-section, an upper panel 46 forming an upper part of the closed cross-section, and a side panel 48 connecting the lower panel 44 and the upper panel 46.

The outer flange 42 and the upper panel 46 may be formed in a step shape, and the outer flange 42 may be positioned higher than the upper panel 46. That is, the outer flange 42 may be formed with a difference H higher than the upper panel 46 referring to FIG. 8. The outer flange 42 must have adequate strength to mount the bumper cover 60 and the head lamp 70, and must be able to manage the matching quality of the welding flange and the assemble quality (tolerance and deflection) of the assembly. In other words, it is possible to increase the strength of the outer flange 42 and manage the assemble quality easily through the flush difference H.

Considering the formability of the "U" shaped cross-section of the upper outer panel 40, this step is given in +H direction. That is, when this step is formed in the −H direction, forming may become difficult due to the occurrence of undercuts in the forming direction.

One end 62 of the bumper cover 60 is bent, and the end 62 may contact near the step shape of the outer flange 42 and the upper panel 46.

The bumper cover 60 covers the welding traces W of the inner flange 22 and the outer flange 42 to improve the appearance, and is adjacent to the step shape of the outer flange 42 and the upper panel 46 to contact the upper outer panel 40, so that occurrence of undercut can be suppressed by contacting the upper outer panel 40.

The end portion 50 of the upper panel 46 is undergone burring process to inhibit injury to the worker by the end portion 50.

Figure 8:
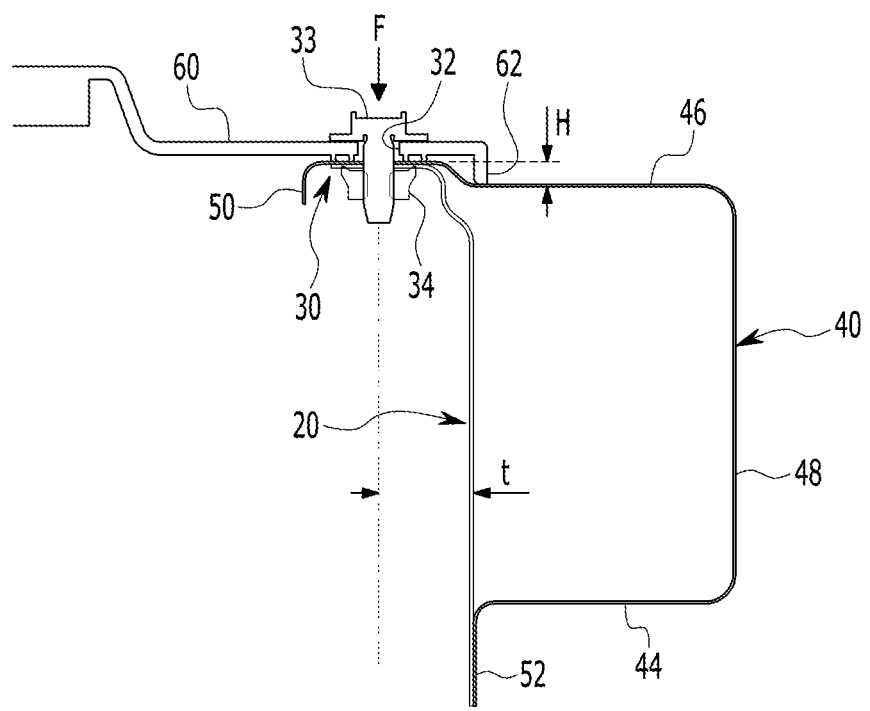
FIG. 8 is a cross-sectional view along the line VIII-VIII of FIG. 1.

FIG. 8 is a cross-sectional view along the line VIII-VIII of FIG. 1.

Referring to FIG. 8, a bumper cover hole 32 is formed in the front flange 30, and the bumper cover 60 can be coupled to the front flange 30 through the bumper cover hole 32. For example, the bumper cover 60 can be bolted to the front flange 30 through a bumper cover bolt 33 and a bumper cover nut 34.

Figure 9:
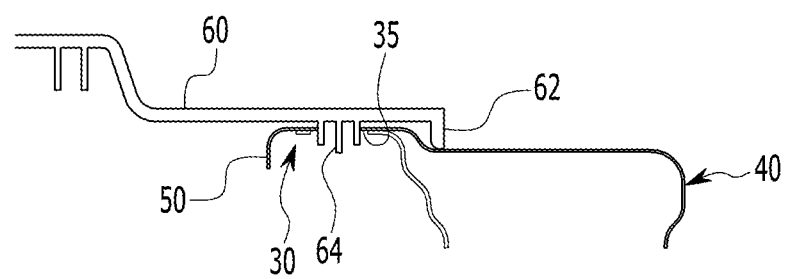
FIG. 9 is a cross-sectional view along the line IX-IX of FIG. 1.
Figure 9:
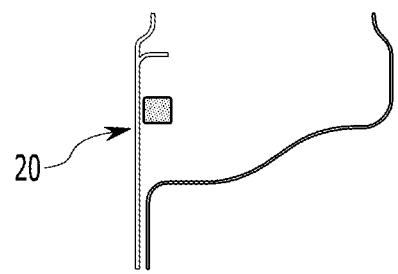

FIG. 9 is a cross-sectional view along the line IX-IX of FIG. 1.

Referring to FIG. 9, an assemble guide hole 35 may be formed in the front flange 30, and an assemble guide pin 64 inserted into the assemble guide hole 35 may be formed in the bumper cover 60. That is, after the assemble guide pin 64 is inserted into the assemble guide hole 35 to limit the position of the bumper cover 60, the bumper cover 60 can be easily assembled to the front flange 30.

Figure 10:
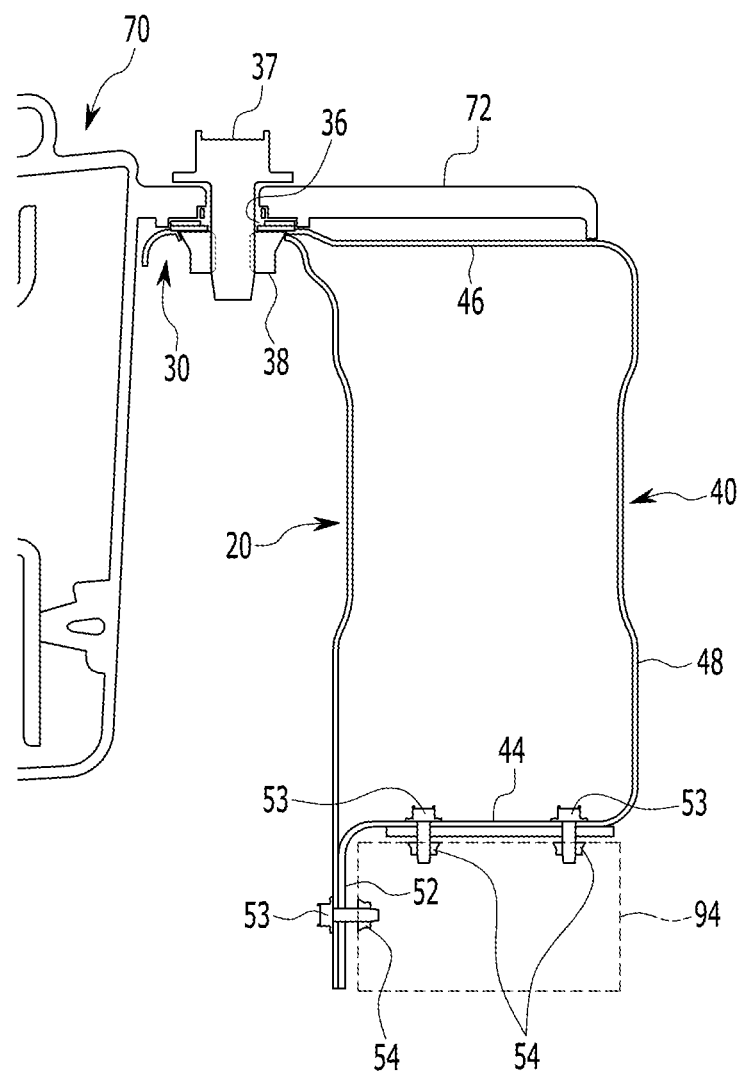
FIG. 10 is a cross-sectional view along the line X-X of FIG. 1.

FIG. 10 is a cross-sectional view along the line X-X of FIG. 1.

Referring to FIG. 10, a head lamp hole 36 is formed in the front flange 30, and the head lamp 70 can be joined through the head lamp hole 36.

The head lamp 70 can be bolted to the front flange 30 through a head lamp bolt 37 and a head lamp nut 38, for example.

Referring to FIG. 8 and FIG. 10, the upper outer panel 40 further includes a lower flange 52 bent at the lower panel 44 and in contact with the upper inner panel 20, and the upper inner panel 20 and the lower flange 52 can be bolted together via a lower flange bolt 53 and a lower flange nut 54. The lower flange 52 may be fixed to, for example, a fender apron 94.

In addition, the lower panel 44 may also be coupled to the fender apron 94 through the lower flange bolt 53 and the lower flange nut 54.

Figure 11:
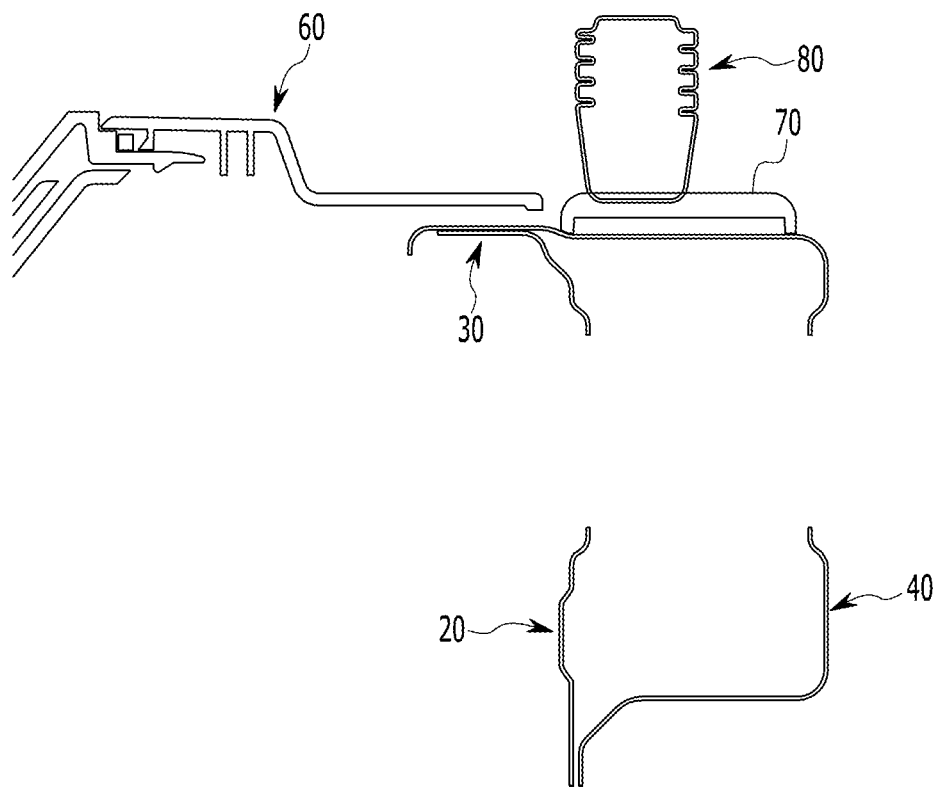
FIG. 11 is a cross-sectional view along the line XI-XI of FIG. 1.

FIG. 11 is a cross-sectional view along the line XI-XI of FIG. 1.

Referring to FIG. 11, an overslam bumper 80 may be provided on the top of the head lamp 70.

The overslam bumper 80 absorbs impact when closing a hood (not shown), and a certain strength is desired for the panel supporting the overslam bumper 80.

In the case of the radiator support upper member assembly according to one form of the present disclosure, the head lamp 70 is provided on the upper outer panel 40, and the overslam bumper 80 is provided on the head lamp 70. That is, since the head lamp 70 covers the upper outer panel 40 and supports the overslam bumper 80, deformation of the upper outer panel 40 can be suppressed.

Figure 12:
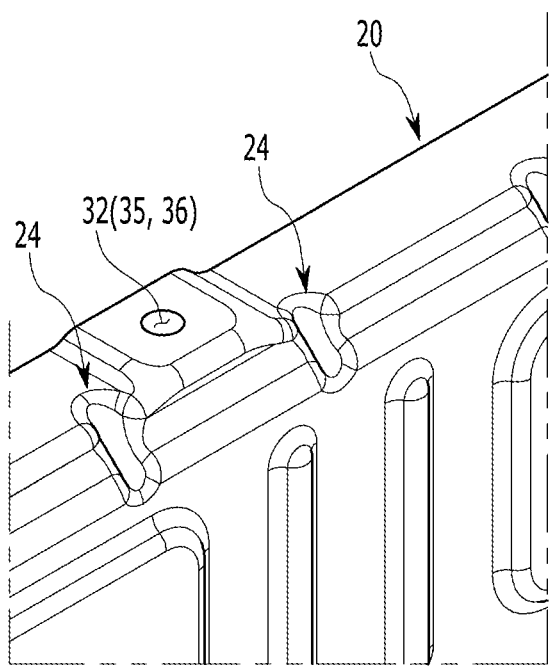
FIG. 12 is a partial perspective view of an upper inner panel of a radiator support upper member assembly according to one form of the present disclosure.

FIG. 12 is a partial perspective view of an upper inner panel of a radiator support upper member assembly according to one form of the present disclosure.

Strength bead 24 may be formed on the upper inner panel 20.

The upper inner panel 20 is combined with the upper outer panel 40 to form the radiator support upper member 12 with a closed cross-section. In addition, the bumper cover hole 32, the assemble guide hole 35 and the head lamp hole 36 are formed in the upper inner panel 20, and the bumper cover 60 and the head lamp 70 are mounted, so local strength is desired.

In other words, to provide the local strength of the upper inner panel 20 and inhibit deflection of the upper inner panel 20, the strength bead 24 may be formed in the vicinity of the bumper cover hole 32, the assemble guide hole 35 and the head lamp hole 36 and the flange corner and the like.

Figure 13:
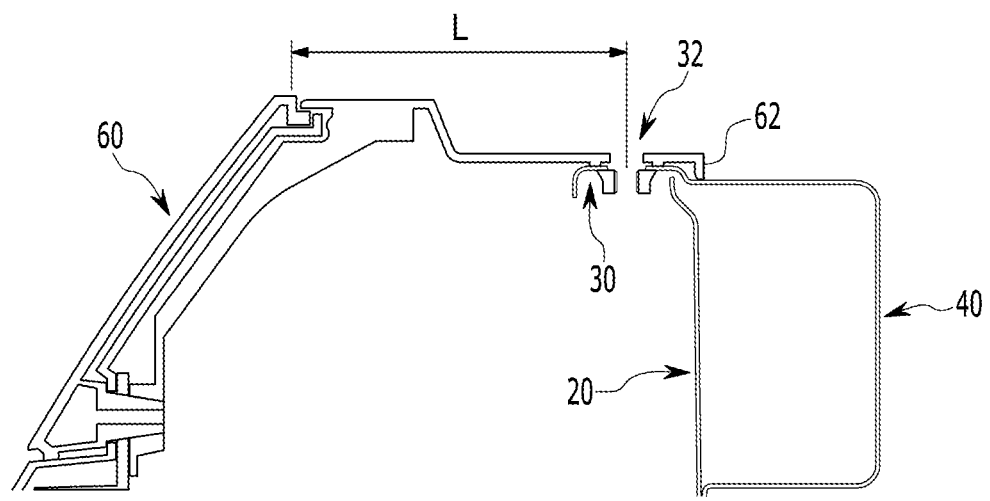
FIG. 13 is a side cross-sectional view of a radiator support upper member assembly according to one form of the present disclosure.

FIG. 13 is a side cross-sectional view of a radiator support upper member assembly according to one form of the present disclosure.

Referring to FIG. 13, the radiator support upper member assembly 10 according to one form of the present disclosure disposes the front flange 30 for mounting the bumper cover 60 on the front of the radiator support upper member 12, thereby reducing the distance L between the mounting positions in the hood parting.

The front flange 30 is formed by joining the upper inner panel 20 and the upper outer panel 40, and the bumper cover 60 and the headlamp 70 can be mounted on the welded and overlapped flange without a separate bracket. Therefore, the radiator support upper member assembly according to one form of the present disclosure can improve the entire strength and inhibit appearance defects due to bumper deflection.

Also, referring to FIG. 8, in the radiator support upper member assembly according to one form of the present disclosure, since the bumper cover 60 and the front flange 30 that mounts the head lamp 70 are formed on the front of the vehicle, so that the moment by the load F of the bumper cover 60, for example, the moment (H×F) for the upper panel 46, or the moment (t×F) for the lower panel 44 can be reduced. Therefore, the torsion of the radiator support upper member 12 by the load of the bumper cover 60 and the headlamp 70 can be suppressed.

In addition, according to the radiator support upper member assembly according to one form of the present disclosure, the bumper cover 60 and the headlamp 70 can be mounted without a separate bracket, thereby reducing manufacturing cost and entire weight.

In addition, according to the radiator support upper member assembly according to one form of the present disclosure, it is possible to cover welding traces, and to improve marketability such as bumper deflection.

While this disclosure has been described in connection with what is presently considered to be practical exemplary forms, it is to be understood that the disclosure is not limited to the disclosed forms.

<Description of symbols>

| | |
|---|---|
| 10: radiator support upper member assembly | |
| 12: radiator support upper member | 20: upper inner panel |
| 22: inner flange | 24: strength bead |
| 30: front flange | 32: bumper cover hole |
| 33: bumper cover bolt | 34: bumper cover nut |
| 35: assemble guide hole | 36: head lamp hole |
| 37: head lamp bolt | 38: head lamp nut |
| 40: upper outer panel | 42: outer flange |
| 44: lower panel | 46: upper panel |
| 48: side panel | 50: end portion |
| 52: lower flange | 53: lower flange bolt |
| 54: lower flange nut | 60: bumper cover |
| 62: bumper cover end | 64: assemble guide pin |
| 70: head lamp | 72: head lamp bracket |
| 80: overslam bumper | 90: front member |
| 92: side member | 94: fender apron |

What is claimed is:

1. A radiator support upper member assembly comprising:
   an upper inner panel including an inner flange protruding toward a front direction; and
   an upper outer panel including an outer flange,
   wherein the outer flange protrudes toward the front direction and is configured to overlap the inner flange and form a front flange, and
   the upper inner panel and the upper outer panel are joined and form a closed cross-section,
   wherein the upper outer panel comprises:
      a lower panel forming a bottom of the closed cross-section;
      an upper panel forming a top of the closed cross-section; and
      a side panel connecting the lower panel and the upper panel, and
   wherein the outer flange and the upper panel form a step shape and the outer flange is positioned higher than the upper panel.

2. The radiator support upper member assembly of claim 1, wherein the inner flange and the outer flange are welded together.

3. The radiator support upper member assembly of claim 1, wherein an end portion of the upper panel is a burring-processed portion.

4. The radiator support upper member assembly of claim 1, further comprising a bumper cover connected to the front flange.

5. The radiator support upper member assembly of claim 4, further comprising a bumper cover hole formed on the front flange,
   wherein the bumper cover is connected to the front flange through the bumper cover hole.

6. The radiator support upper member assembly of claim 5, wherein the bumper cover is bolted to the front flange.

7. The radiator support upper member assembly of claim 4, wherein the bumper cover includes: an end that is bent formed in a step shape and contacts the outer flange and the upper panel.

8. The radiator support upper member assembly of claim 4, further comprising an assemble guide hole formed on the front flange; and
   an assemble guide pin inserted into the assemble guide hole and formed on the bumper cover.

9. The radiator support upper member assembly of claim 1, further comprising a head lamp coupled to the front flange.

10. The radiator support upper member assembly of claim 9, further comprising a head lamp hole formed in the front flange,
    wherein the head lamp is connected to the front flange through the head lamp hole.

11. The radiator support upper member assembly of claim 10, wherein the head lamp is bolted to the front flange.

12. The radiator support upper member assembly of claim 9, further comprising an overslam bumper provided on the head lamp.

13. The radiator support upper member assembly of claim 1, wherein the upper inner panel includes a strength bead formed thereon.

14. A radiator support upper member assembly comprising:
    an upper inner panel including an inner flange protruding toward a front direction; and
    an upper outer panel including an outer flange,
    wherein the outer flange protrudes toward the front direction and is configured to overlap the inner flange and form a front flange, and the upper inner panel and the upper outer panel are joined and form a closed cross-section,
    wherein the upper outer panel comprises:
        a lower panel forming a bottom of the closed cross-section;
        an upper panel forming a top of the closed cross-section; and
        a side panel connecting the lower panel and the upper panel, and
    wherein the upper outer panel further comprises: a lower flange bent at the lower panel and in contact with the upper inner panel,
    wherein the upper inner panel and the lower flange are bolted together.

15. A radiator support upper member assembly comprising:
    an upper inner panel including an inner flange protruding toward a front direction;
    an upper outer panel including an outer flange,
    wherein the outer flange protrudes toward the front direction and is configured to overlap the inner flange and form a front flange, and the upper inner panel and the upper outer panel are joined and form a closed cross-section;
    a head lamp coupled to the front flange; and
    a head lamp hole formed in the front flange,
    wherein the head lamp is connected to the front flange through the head lamp hole.

* * * * *